Dec. 29, 1942.  W. NOBLE  2,306,490
VALVE
Filed Sept. 11, 1939   2 Sheets-Sheet 1
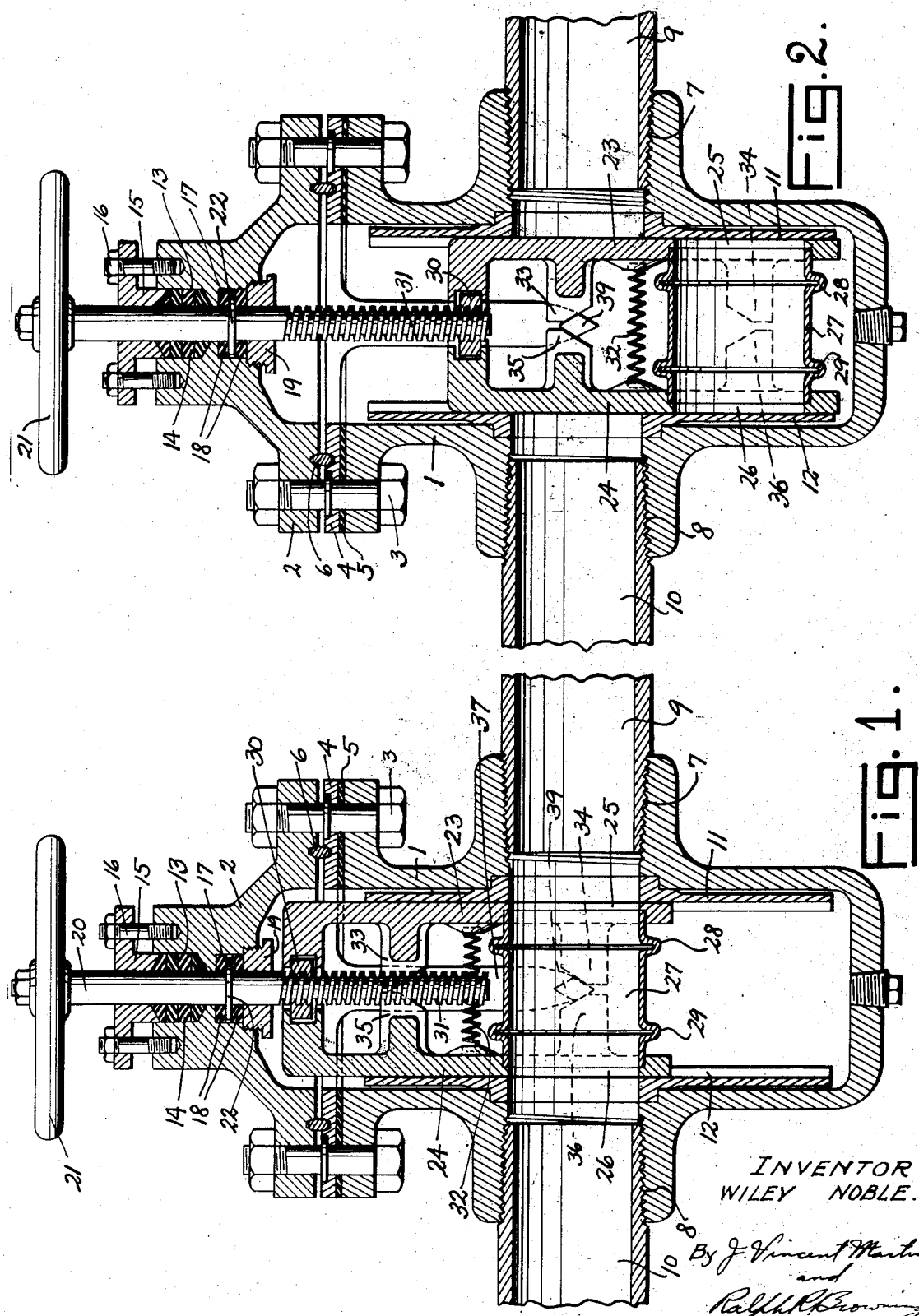
INVENTOR
WILEY NOBLE.
By J. Vincent Martin
and
Ralph R. Browning
ATTORNEYS Dec. 29, 1942.  W. NOBLE  2,306,490

VALVE

Filed Sept. 11, 1939  2 Sheets-Sheet 2

INVENTOR
WILEY NOBLE

By J. Vincent Martin
and
Ralph A. Browning
ATTORNEYS

Patented Dec. 29, 1942

2,306,490

UNITED STATES PATENT OFFICE 2,306,490

VALVE

Wiley Noble, Houston, Tex., assignor to Reed Roller Bit Company, Houston, Tex., a corporation of Texas Application September 11, 1939, Serial No. 294,269

8 Claims. (Cl. 251—68)

This invention relates to valves, and has for its general object the provision of a valve which may be easily opened or closed under pressure from either direction.

It is a well known fact that valves of the gate valve type which are customarily formed in a sort of wedge shape for the purpose of forcing them tightly against their seats, are difficult to open or close under pressure. This is because when the valve element is wedged in place and pressure placed on it from one side or the other, the pressure causes a tremendous friction between the valve element and its seat which is in addition to the friction caused by the wedging section between the valve and its seat. It is an object of this invention to provide a valve in which this frictional resistance to movement of the valve element will be reduced to a minimum.

It is a further object of this invention to provide a valve in which there will be a substantially uniform flow opening through the valve element when it is in its open position.

Another object of this invention is to provide a construction of the type set forth in which the valve element will be firmly seated against its seats both in open and in closed position.

Other objects and advantages of this invention will become apparent from the following description taken in connection with the accompanying drawings wherein is set forth by way of illustration and example one embodiment of this invention:

In the drawings:

Fig. 1 is a vertical cross section through a valve constructed in accordance with this invention, showing the same in open position.

Fig. 2 is a similar view of the same valve in closed position.

Figure 4:
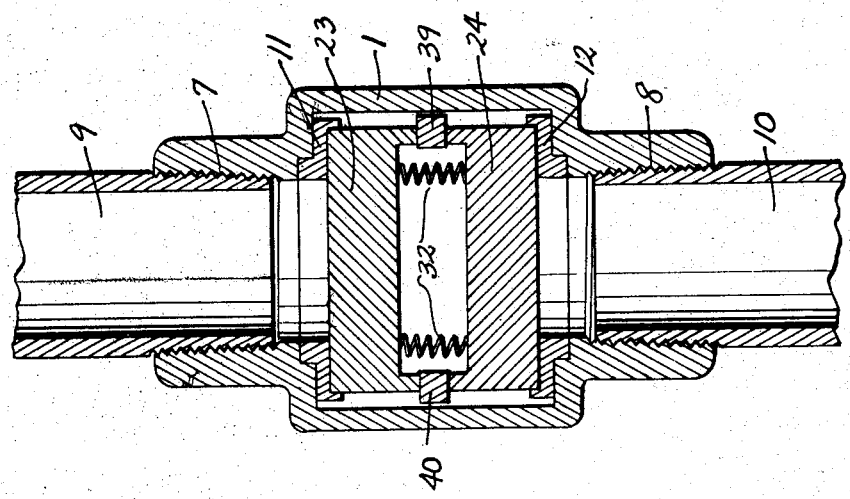
Fig. 4 is a horizontal cross section taken along the line 4—4 of Fig. 3.
Figure 3:
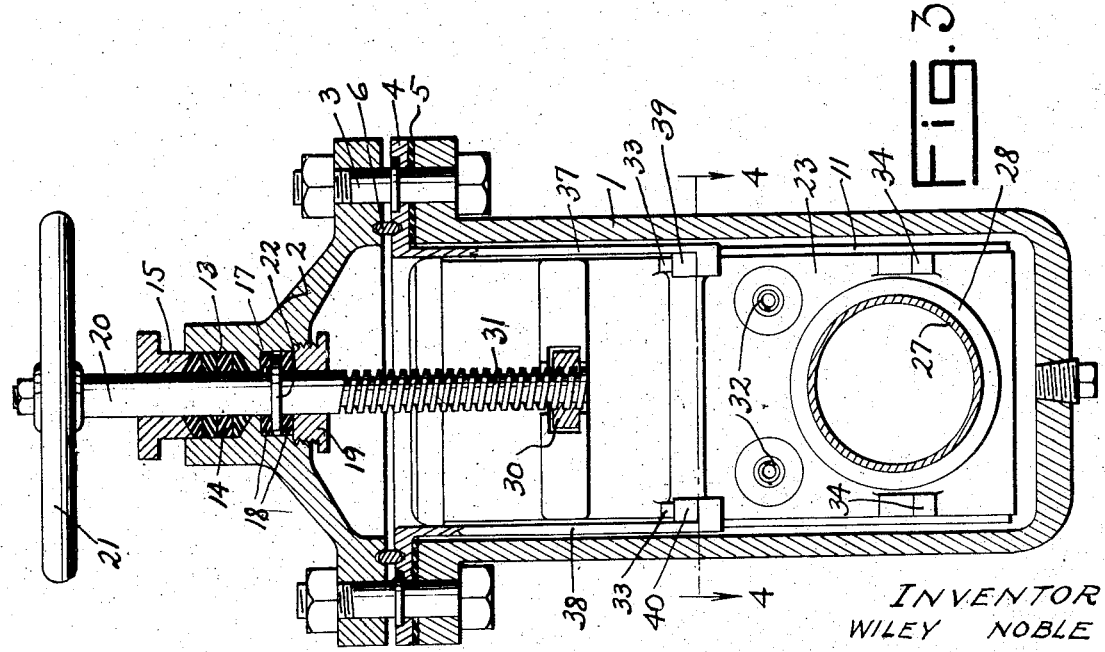
Fig. 3 is a vertical cross section of the valve shown in Fig. 2 taken at right angles to Fig. 2.

The valve body is indicated at 1 and is closed at its upper end by means of the usual bonnet 2 secured in place by means of bolts 3. Intermediate the body 1 and the bonnet 2 there is secured a ring element 4 which is for a purpose presently to be described. Between the element 4 and the body 1 there is inserted a sealing means 5 and a metallic or other sealing ring 6 is inserted between the element 4 and the bonnet 2.

The valve body is provided on opposite sides with flow openings 7 and 8 respectively, adapted to receive the flow lines 9 and 10 respectively.

Mounted within the body 1 and having parts surrounding the respective flow openings 7 and 8 there are positioned valve seating elements carrying guides and designated by the numerals 11 and 12, respectively. Each of these elements 11 and 12 has a part which is countersunk into the inner face of the body 1 to prevent slippage of such part with respect to the body 1 as the valve is opened and closed.

The bonnet is provided with a stuffing box 13 in which are mounted packing rings or other packing means 14 adapted to be held in place by means of a gland 15. The gland 15 in turn is secured to the bonnet 2 by means of bolts 16. The bonnet 2 is also provided with a thrust receiving means in the form of a box 17 below the packing box 13, which box 17 has a pair of thrust washers 18 therein, and these thrust washers are held in position by means of a plug 19 threaded into the bonnet from the interior thereof.

Passing through the boxes 13 and 17 is a screw shaft 20 having a hand wheel 21 or other means for rotating it on its upper end. This shaft is also provided with an integral laterally extending flange 22 which fits between the two washers 18 and serves as a thrust bearing for the shaft 20 to prevent it from moving longitudinally.

Slidably mounted between the guides 11 and 12 are a pair of slides 23 and 24 respectively which go to make up the composite valve element of this invention. These slides are each formed with openings 25 and 26 adapted when the respective slides are in their upper position to register with the openings through the guides 11 and 12. These openings 25 and 26 are connected with each other by means of an expansible cylindrical connector 27 having circumferential corrugations 28 and 29 that make possible the longitudinal expansion and contraction of this element. It will be seen that with this element between them, the slides 23 and 24 may actually move away from each other to seat firmly against their respective seats without interrupting the continuity of the connection between them.

At their upper ends, the slides are provided with complementary notched openings adapted to receive the nut 30, this nut being of such a size that it cannot escape from between the two slides 23 and 24 and of such a size that it will prevent a substantial amount of vertical movement of these slides with respect to each other. This nut 30 is threaded to receive the threaded portion 31 of the screw shaft 20 so that when the screw shaft 20 is rotated the nut 30 and the slides 23 and 24 will be moved upwardly or downwardly depending upon the direction of rotation of the shaft 20.

The slides 23 and 24 are normally spring pressed away from each other and against their respective seats by means of springs 32 interposed between them.

Each of the slides 23 and 24 is also provided adjacent its opposite edges with lugs which extend toward the opposite slide, those on the slide 23 being designated by the numerals 33 and 34 respectively, and those on the slide 24 being designated by the numerals 35 and 36 respectively. It will be seen that these lugs are formed in pairs and that the lugs on the respective slides are complementary to each other, the upper sets of lugs being beveled on their lower and inner faces and the lower sets of lugs being beveled on their upper and inner faces.

Secured to and depending from the ring 4 within the valve body are a pair of arms 37 and 38 respectively, which carry on their lower ends double wedges in the form of diamond shape members 39 and 40 respectively.

In operation, the valve just described is opened or closed in the usual manner by means of the hand wheel 21. Referring to Figs. 1 and 2 for example, if the hand wheel shown in Fig. 1 be rotated to the right, the nut 30 will be moved downwardly and will move the slides 23 and 24 until these slides are at the lower extremity of their movement, in which position the solid portions of these slides will overlie the openings through the guides 11 and 12. During this movement, these slides will be pressed against their guides by means of the springs 32 only.

When the slides reach the lower extremity of their travel as shown in Fig. 2 the upper lugs 33 and 35 on the respective slides will come into engagement with the upper wedge-shaped portions of the double wedge members 39 and 40, and as downward movement of these slides is continued, they will be wedged toward their respective guides so as to seat and seal firmly thereagainst.

If now it be desired to open the valve, the hand wheel is rotated to the left, and the first movement of the nut 30 will tend to pull the slides 23 and 24 upwardly, thus moving them away from the wedges 39 and 40 and relieving the force with which they are pressed against their respective seats. The valve elements 23 and 24 will thus be released from their firm engagement with their seats and may be readily moved upwardly. When they have reached the position substantially as shown in Fig. 1, the lugs 34 and 36 will come in contact with the wedge members 39 and 40 and the slides will again be wedged apart and away from each other as upward movement continues. Again they will be seated against their respective seats on the guides 11 and 12, but this time they will be seated with their openings 25 and 26 in alignment with the openings through the guides and with the flow openings 7 and 8 in the body of the valve. As they are thus wedged apart, the expansible member 27 will accommodate for this movement and will when they are so wedged apart serve to form a continuous connection between them.

It will be seen that the double wedge elements 39 and 40 are located substantially in alignment with the central line of the flow openings through the valve body and hence on substantially the same level with the central portions of the seats upon which the slides are adapted to seat. Thus, the forces with which these slides are moved against their seats will be exerted upon them at positions substantially in alignment with the seats, thus insuring uniform seating and a more perfect seal.

It will be seen also from the foregoing that a valve has been provided which is capable of being easily opened and closed even though heavy pressure may be exerted against it, that a valve has been provided in which a substantially continuous fluid flow passageway is provided through the valve when it is open, and that a valve has been provided which is capable of carrying out and accomplishing all of the other objects and advantages sought by this invention.

Having described my invention, I claim:

1. In a valve, in combination, a valve body having flow openings therein, a pair of valve elements within said valve body and movable to and from closed position over said flow openings, each of said valve elements having an opening therein adapted to register with its respective flow opening when said valve is in open position, and an extensible continuous conduit extending between the said openings in the respective valve elements to form a continuous fluid path between the flow openings of said valve when the valve is in open position.

2. In a valve, in combination, a valve body having flow openings therein, a pair of valve elements within said valve body and movable to and from closed position over said flow openings, each of said valve elements having an opening therein adapted to register with its respective flow opening when said valve is in open position, an extensible continuous conduit extending between the said openings in the respective valve elements to form a continuous fluid path between the flow openings of said valve when the valve is in open position, and wedging means for wedging said elements apart and into engagement with said flow openings when said elements are moved to either extreme open or closed position.

3. In a valve, in combination, a valve body having flow openings therein, a pair of valve elements within said valve body and movable to and from closed position over said flow openings, each of said valve elements having an opening therein adapted to register with its respective flow opening when said valve is in open position, an extensible conduit extending between the said openings in the respective valve elements to form a continuous fluid path between the flow openings of said valve when the valve is in open position, and wedging means in alignment with a central plane of said flow openings for wedging said elements into engagement with said flow openings respectively when said elements are in either extreme open or closed position.

4. In a valve, in combination, a valve body having flow openings therein, a pair of valve elements within said valve body and movable to and from closed position over said flow openings, each of said valve elements having an opening therein adapted to register with its respective flow opening when said valve is in open position, an extensible continuous conduit extending between the said openings in the respective valve elements to form a continuous fluid path between the flow openings of said valve when the valve is in open position, and a double wedging member interposed between said elements in alignment with a central plane of said flow openings, and cooperating wedging surfaces on said elements adapted to cooperate with said member when said elements approach either extremity of movement to wedge them against their respective flow openings.

5. In a valve, in combination, a valve body having flow openings therein, a pair of valve elements within said valve body and movable to and from closed position over said flow openings, each of said valve elements having an opening therein adapted to register with its respective flow opening when said valve is in open position, an extensible continuous conduit extending between the said openings in the respective valve elements to form a continuous fluid path between the flow openings of said valve when the valve is in open position, a pair of guides having parts seated in said flow openings respectively and providing guiding means for said elements and seats for said elements about said flow openings, and a pair of double wedge members interposed between said elements in substantial alignment with a central plane of said flow openings, and cooperating wedge surfaces on said elements adapted to cooperate with said members when said elements approach either extremity of movement to wedge them against their seats.

6. In a valve, in combination, a valve body having flow openings therein, a pair of valve elements within said valve body and movable to and from closed position over said flow openings, each of said valve elements having an opening therein adapted to register with its respective flow opening when said valve is in open position, a pair of guides having parts seated in said flow openings respectively and providing guiding means for said elements and seats for said elements about said flow openings, and a pair of stationary double wedge members interposed between said elements in substantial alignment with a central plane of said flow openings, and cooperating wedge surfaces on said elements adapted to cooperate with said members when said elements approach either extremity of movement to wedge them against their seats.

7. In a valve, a valve body having flow openings and an open end, a bonnet closing the open end of the body, means for securing the bonnet to said valve body, a support secured between the body and bonnet, a pair of slides within said valve body and slidable to and from positions closing said flow openings respectively, means for moving said slides to and from closed positions simultaneously, arms extending from said support between said slides, and means carried by arms adjacent the flow openings for wedging said slides into firmly seated positions against said respective flow openings both in the open and closed positions of said slides.

8. In a valve, a valve body having flow openings and an open end, a bonnet closing the open end of the body, means for securing the bonnet to said valve body, a support secured between the body and bonnet, a pair of slides within said valve body and slidable to and from positions closing said flow openings respectively, having openings adjacent one end thereof to register with the flow openings when in open position and having imperforate portions adjacent the other end thereof for closing the flow openings when in closed position, means for simultaneously sliding the slides to and from open and closed positions, arms extending from said support between said slides, stationary spreading means carried by the arms adjacent the flow openings, means on the slides adjacent the imperforate ends thereof for engaging the spreading means when the slides are in closed position to spread the slides apart and force them against the flow openings, and means on the slides adjacent the ends having the openings therein for engaging the spreading means when the slide openings register with the flow openings to spread the slides apart and force them against the flow openings.

WILEY NOBLE.